United States Patent
Saikou

(10) Patent No.: US 12,530,877 B2
(45) Date of Patent: Jan. 20, 2026

(54) DISPLAY CANDIDATE AREA INFORMATION ACCORDING TO DISPLAY MODE DETERMINED FOR DECISION-MAKING BASED ON EVALUATION RESULT BY MACHINE LEARNING MODEL

(71) Applicant: NEC Corporation, Tokyo (JP)

(72) Inventor: Masahiro Saikou, Tokyo (JP)

(73) Assignee: NEC Corporation, Tokyo (JP)

( * ) Notice: Subject to any disclaimer, the term of this patent is extended or adjusted under 35 U.S.C. 154(b) by 294 days.

(21) Appl. No.: 17/926,909

(22) PCT Filed: May 26, 2020

(86) PCT No.: PCT/JP2020/020778
§ 371 (c)(1),
(2) Date: Nov. 21, 2022

(87) PCT Pub. No.: WO2021/240656
PCT Pub. Date: Dec. 2, 2021

(65) Prior Publication Data
US 2023/0230364 A1 Jul. 20, 2023

(51) Int. Cl.
*G06V 10/776* (2022.01)
*A61B 1/00* (2006.01)
(Continued)

(52) U.S. Cl.
CPC ...... *G06V 10/776* (2022.01); *A61B 1/000094* (2022.02); *A61B 1/0005* (2013.01);
(Continued)

(58) Field of Classification Search
None
See application file for complete search history.

(56) References Cited

U.S. PATENT DOCUMENTS

2020/0193236 A1 6/2020 Oosake
2020/0337537 A1 10/2020 Hirasawa et al.
(Continued)

FOREIGN PATENT DOCUMENTS

JP 2020-051982 A 4/2020
JP 2020-073081 A 5/2020
(Continued)

OTHER PUBLICATIONS

JP Office Communication for JP Application No. 2022-527329, mailed on Jun. 25, 2024 with English Translation.
(Continued)

*Primary Examiner* — Andrew H Lam
(74) *Attorney, Agent, or Firm* — Sughrue Mion, PLLC

(57) ABSTRACT

The image processing device 1X includes a detection model evaluation means 31X and a display control means 33X. The detection model evaluation means 31X is configured to perform an evaluation on suitability of a detection model for detecting an attention area to be noted based on a captured image Ic in which an inspection target is photographed by a photographing unit provided in an endoscope. The display control means 33X is configured to display candidate area information according to a display mode determined based on a result of the evaluation, the candidate area information indicating one or more candidate areas that are one or more candidates of the attention area, the candidate areas being detected by one or more detection models included in detection model(s) subjected to the evaluation, the candidate area information being superimposed on the captured image Ic which is displayed by a display device 2X.

13 Claims, 14 Drawing Sheets

(51) Int. Cl.
  *G06T 7/00* (2017.01)
  *G06T 11/20* (2006.01)
(52) U.S. Cl.
  CPC .......... *G06T 7/0012* (2013.01); *G06T 11/203* (2013.01); *G06T 2207/10068* (2013.01); *G06T 2207/20081* (2013.01); *G06T 2207/30096* (2013.01); *G06V 2201/03* (2022.01)

(56) References Cited

U.S. PATENT DOCUMENTS

| | | | |
|---|---|---|---|
| 2021/0149182 A1* | 5/2021 | Hayami | G02B 23/2484 |
| 2021/0153730 A1* | 5/2021 | Karino | A61B 1/0661 |
| 2022/0092362 A1 | 3/2022 | Oosake | |

FOREIGN PATENT DOCUMENTS

| | | |
|---|---|---|
| WO | 2019/054045 A1 | 3/2019 |
| WO | 2019/087791 A1 | 5/2019 |
| WO | 2019/123986 A1 | 6/2019 |
| WO | 2020/003607 A1 | 1/2020 |
| WO | 2020/003992 A1 | 1/2020 |
| WO | 2020/036121 A1 | 2/2020 |

OTHER PUBLICATIONS

International Search Report for PCT Application No. PCT/JP2020/020778, mailed on Aug. 11, 2020.

\* cited by examiner

100: ENDOSCOPIC INSPECTION SYSTEM

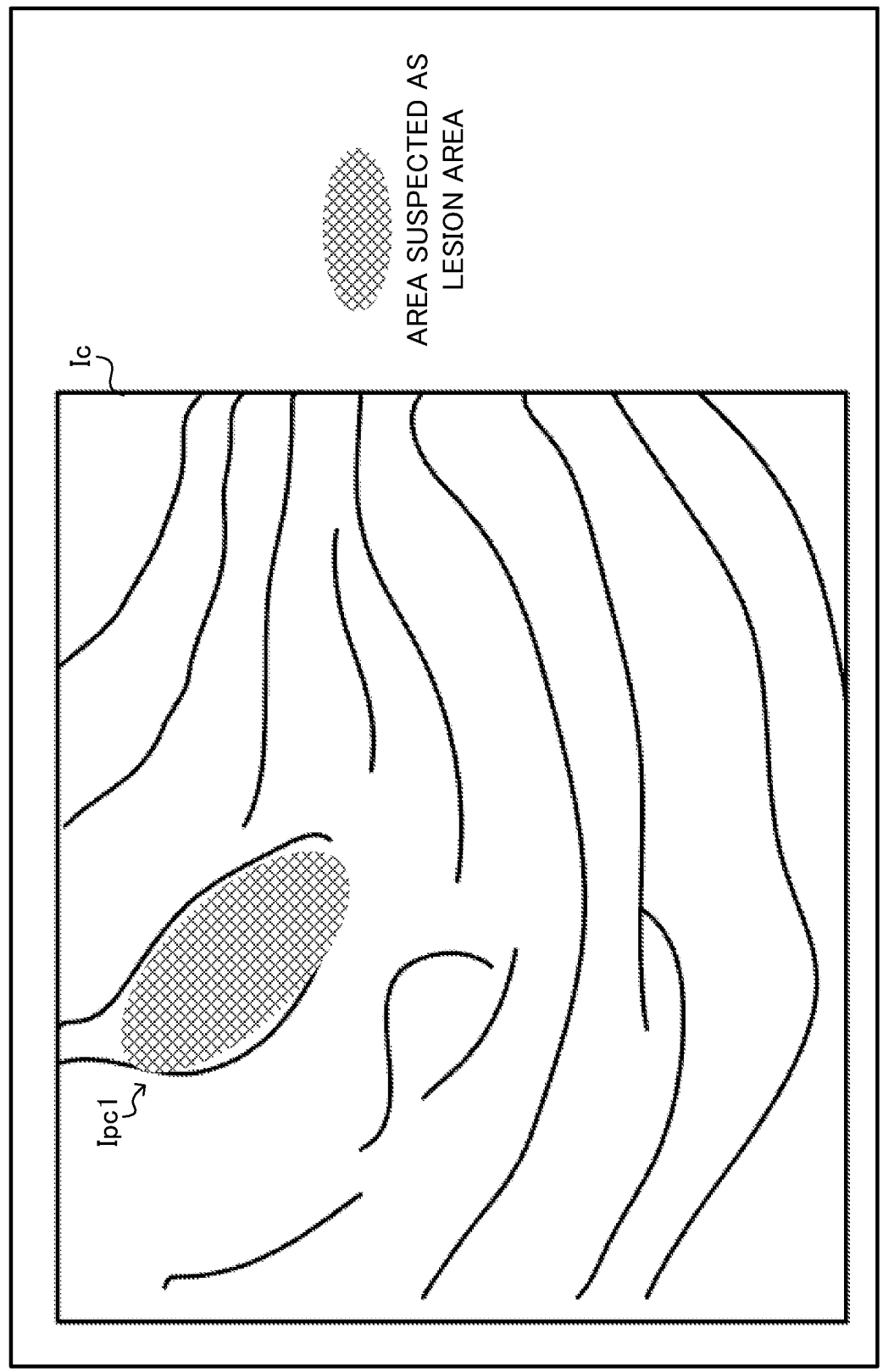

DISPLAY CANDIDATE AREA INFORMATION ACCORDING TO DISPLAY MODE DETERMINED FOR DECISION-MAKING BASED ON EVALUATION RESULT BY MACHINE LEARNING MODEL

This application is a National Stage Entry of PCT/JP2020/020778 filed on May 26, 2020, the contents of all of which are incorporated herein by reference, in their entirety.

TECHNICAL FIELD

The present disclosure relates to a technical field of an image processing device, a control method, and storage medium for processing images acquired in endoscopic inspection.

BACKGROUND ART

An endoscopic system for displaying images taken in the lumen of an organ is known. For example, Patent Literature 1 discloses a learning method of a learning model configured to output a lesion area included in a captured image data when the captured image data generated by the photographing device is inputted.

PRIOR ART DOCUMENTS

Patent Literature

Patent Literature 1: WO2020/003607

SUMMARY

Problem to be Solved by the Invention

When a learned model is used to detect a lesion area and the like from an image taken in endoscopic inspection, the reliability of detection results differs depending on the suitability of the model used for detection. There is no disclosure in Patent Literature 1 regarding a point in which detection results are displayed in consideration of such suitability of the model.

In view of the above-described issue, it is therefore an example object of the present disclosure to provide an image processing device, a control method, and a storage medium capable of suitably displaying detection results of an attention area such as a lesion area in endoscopic inspection.

Means for Solving the Problem

One mode of the image processing device is an image processing device including: a detection model evaluation means configured to perform an evaluation on suitability of a detection model for detecting an attention area to be noted based on a captured image in which an inspection target is photographed by a photographing unit provided in an endoscope; and a display control means configured to display candidate area information according to a display mode determined based on a result of the evaluation, the candidate area information indicating one or more candidate areas that are one or more candidates of the attention area, the candidate areas being detected by one or more detection models included in detection model(s) subjected to the evaluation, the candidate area information being superimposed on the captured image which is displayed by a display device.

One mode of the control method is a control method executed by a computer, the control method including: performing an evaluation on suitability of a detection model for detecting an attention area to be noted based on a captured image in which an inspection target is photographed by a photographing unit provided in an endoscope; and displaying candidate area information according to a display mode determined based on a result of the evaluation, the candidate area information indicating one or more candidate areas that are one or more candidates of the attention area, the candidate areas being detected by one or more detection models included in detection model(s) subjected to the evaluation, the candidate area information being superimposed on the captured image which is displayed by a display device.

One mode of the storage medium is a storage medium storing a program executed by a computer, the program causing the computer to function as: a detection model evaluation means configured to perform an evaluation on suitability of a detection model for detecting an attention area to be noted based on a captured image in which an inspection target is photographed by a photographing unit provided in an endoscope; and a display control means configured to display candidate area information according to a display mode determined based on a result of the evaluation, the candidate area information indicating one or more candidate areas that are one or more candidates of the attention area, the candidate areas being detected by one or more detection models included in detection model(s) subjected to the evaluation, the candidate area information being superimposed on the captured image which is displayed by a display device.

Effect of the Invention

An example advantage according to the present invention is to suitably display a candidate of an attention area such as a lesion area.

BRIEF DESCRIPTION OF THE DRAWINGS

FIG. 5 illustrates a first display example of the display screen image displayed by a display device in endoscopic inspection.

EXAMPLE EMBODIMENTS

Hereinafter, an example embodiment of an image processing device, a control method, and a storage medium will be described with reference to the drawings.

First Example Embodiment (1) System Configuration

Figure 1:
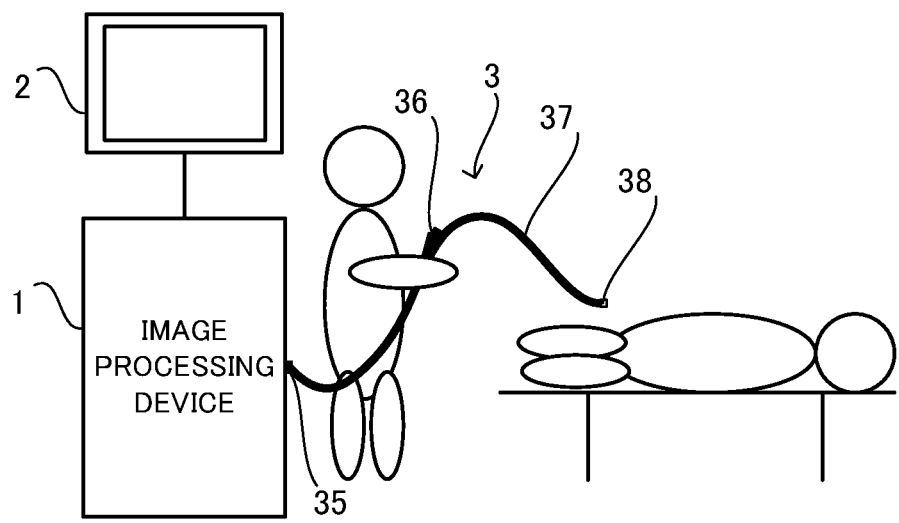
FIG. 1 illustrates the schematic configuration of an endoscopic inspection system.

FIG. 1 shows a schematic configuration of an endoscopic inspection system 100. As shown in FIG. 1, the endoscopic inspection system 100 mainly includes an image processing device 1, a display device 2, and an endoscope 3 connected to the image processing device 1. In the following, as a representative example, the process in the endoscopic inspection of the large bowel will be explained. The inspection target is not limited to the large bowel, and examples of the inspection target also include the esophagus and the stomach.

The image processing device 1 acquires an image (also referred to as "captured image Ia") captured by the endoscope 3 in time series from the endoscope 3 and displays a screen image based on the captured image Ia on the display device 2. The captured image is, for example, an image of the lumen of the large bowel of a subject to be photographed and the captured image Ia is an image captured at predetermined time intervals in at least one of the insertion process of the endoscope 3 to the subject or the ejection process of the endoscope 3 from the subject. In the present example embodiment, by analyzing the captured image Ic, the image processing device 1 detects an area (also referred to as "candidate area Pc") that is a candidate for the lesion area in the lumen, and displays information (also referred to as a "candidate area information Ipc") indicating the detected candidate area on the captured image Ic displayed by the display device 2.

The display device 2 is a display or the like for displaying predetermined information based on the display signal supplied from the image processing device 1.

The endoscope 3 is, for example, a device for photographing the lumen of the large bowel while being inserted into the subject's large bowel. The endoscope 3 mainly includes a connecting unit 35 for connecting with the image processing device 1, an operation unit 36 for inspector to perform a predetermined input, a shaft 37 which is inserted into the lumen and which has flexibility, and a pointed end unit 38 having a built-in photographing portion such as an ultra-small image pickup device.

(2) Hardware Configuration

Figure 2:
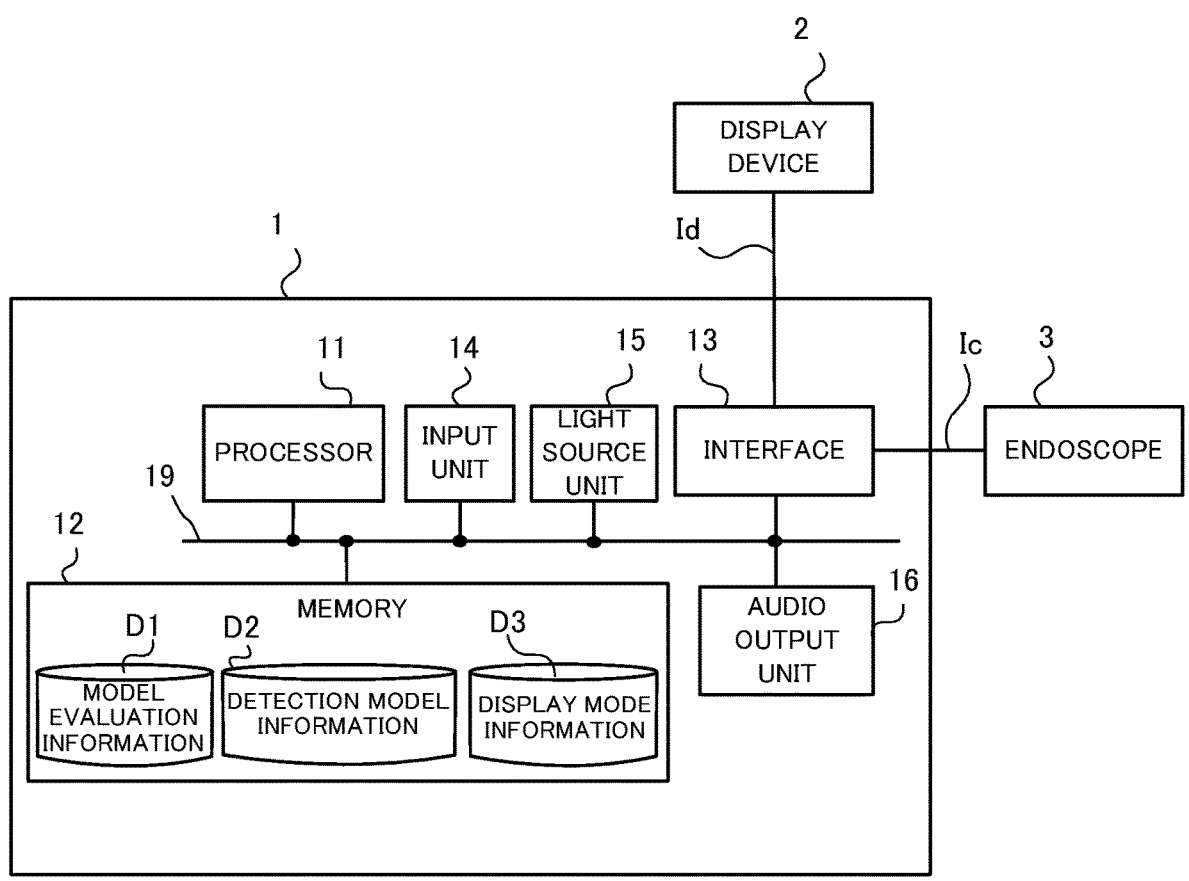
FIG. 2 illustrates a hardware configuration of an image processing device.

FIG. 2 shows the hardware configuration of the image processing device 1. The image processing device 1 mainly includes a processor 11, a memory 12, an interface 13, an input unit 14, a light source unit 15, and an audio output unit 16. Each of these elements is connected via a data bus 19.

The processor 11 executes a predetermined process by executing a program or the like stored in the memory 12. The processor 11 is one or more processors such as a CPU (Central Processing Unit), GPU (Graphics Processing Unit), and a quantum processor.

The memory 12 is configured by a variety of volatile memories which is used as working memories, and non-volatile memories which stores information necessary for the process to be executed by the image processing device 1, such as a RAM (Random Access Memory) and a ROM (Read Only Memory). The memory 12 may include an external storage device such as a hard disk connected to or built in to the image processing device 1, or may include a storage medium such as a removable flash memory. The memory 12 stores a program for the image processing device 1 to execute each process in the present example embodiment. Further, the memory 12 stores model evaluation information D1, detection model information D2, and display mode information D3. Details of these data will be described later. The model evaluation information D1, the detection model information D2, the display mode information D3 may be stored in an external device capable of wired or wireless data communication with the image processing device 1 instead of being stored in the memory 12.

The interface 13 performs an interface operation between the image processing device 1 and an external device. For example, the interface 13 supplies the display information "Id" generated by the processor 11 to the display device 2. Further, the interface 13 supplies the light generated by the light source unit 15 to the endoscope 3. The interface 13 also provides an electrical signal to the processor 11 indicative of the captured image Ia supplied from the endoscope 3. The interface 13 may be a communication interface, such as a network adapter, for wired or wireless communication with the external device, or a hardware interface compliant with a USB (Universal Serial Bus), a SATA (Serial AT Attachment), or the like.

The input unit 14 generates an input signal based on the operation by the inspector. Examples of the input unit 14 include a button, a touch panel, a remote controller, and a voice input device. The light source unit 15 generates light for supplying to the pointed end unit 38 of the endoscope 3. The light source unit 15 may also incorporate a pump or the like for delivering water and air to be supplied to the endoscope 3. The audio output unit 16 outputs a sound under the control of the processor 11.

(3) Overview of Data

Next, the outline of the model evaluation information D1, the detection model information D2, and the display mode information D3 will be described from the detection model information D2.

The detection model information D2 is information on a model (also referred to as "detection model") for detecting a lesion area from a captured image Ic. Here, the detection model information D2 includes information on a plurality of detection models. Here, the detection model information D2 includes parameters for configuring each detection model. For example, the detection model is a model configured to output information on the position of the lesion area in a captured image Ic when the captured image Ic is inputted thereto. Here, the information outputted by the detection model may be a coordinate value of the center of the lesion area, or may indicate the range of the lesion area, or may be a reliability map. Here, the "coordinate value" may be a value indicating the position in the image in pixel units, or may be a value indicating the position in the image in sub-pixel units. The reliability map is a map on an image showing the reliability of the lesion area for each coordinate value. The information outputted by each detection model may be respectively designed to have an output format suitable for each detection model.

The detection model is a learning model learned through machine learning. The detection model may be a learning model based on a neural network, or may be another type of the learning model such as a support vector machine, or may be a combination of them. For example, if the learning model described above is a neural network, such as a convolutional neural network, the detection model information D2 includes various parameters relating to the layer structure, the neuron structure of each layer, number of filters and filter sizes in each layer, and weights of each element of each filter.

In addition, detection models registered in the detection model information D2 are provided for various categories (classes). For example, the detection model registered in the detection model information D2 may be provided for each category of the property of the captured image Ic, or may be provided for each category of the state of the lumen (i.e., the inspection target), or may be provided for each combined category (i.e., category identified by classification with two or more axes) that corresponding to a combination of the above-mentioned categories. Hereafter, a detection model provided according to the property of the captured image Ic is also referred to as "image property dependent detection model", and a detection model provided according to the state of the inspected object is also referred to as "state dependent detection model".

Examples of the image property dependent detection model include a detection model (that is learned, for example, mainly using dark samples of the captured image Ic) for a dark (i.e., less bright in whole) captured image Ic, a detection model for a bright captured image Ic, a detection model for a highly reddish captured image Ic, a detection model for a captured image Ic where blurring (shaking) occurs, and a detection model for a captured image Ic where noise occurs. Examples of the state dependent detection models include a detection model which is specialized for detection of a specific type of the lesion area, and which is provided for each category classified according to the type of the lesion area and a detection model provided for each category classified according to the presence or absence of drug spraying. The type of the lesion area may be classified for each shape that appears as a symptom of the lesion, for example. Since the detection model information D2 includes the information on such state dependent detection models, the image processing device 1 can perform accurate detection of the lesion area for the inspection target in various states.

The model evaluation information D1 is the information on the evaluation model which evaluates the suitability of each detection model based on the captured image Ic. Here, the model evaluation information D1 includes parameters for configuring the evaluation model. For example, the evaluation model is a model configured to output, when a captured image Ic is inputted thereto, information indicating one or more detection models that are suitable for detecting a lesion area from the inputted captured image Ic and the degree of confidence corresponding to the confidence of the suitability of each detection model configured by the detection model information D2 for the detection. The evaluation model may be a learning model based on a neural network, or may be other types of learning models such as a support vector machine, or may be a combination of them. For example, if the learning model described above is a neural network such as a convolutional neural network, the model evaluation information D1 stores various parameters relating to the layer structure, the neuron structure of each layer, the number of filters and filter sizes in each layer, and the weight of each element of each filter.

The display mode information D3 is information relating to the display mode to display, on the captured image Ic, the candidate area information Ipc for specifying the candidate areas Pc detected by the respective detection models. In the first example, the display mode information D3 is information for displaying the candidate area information Ipc according to a display mode suitable for (i.e., depending on) the detection model that detected the candidate area Pc. In the second example, the display mode information D3 is information for determining the display mode of the candidate area information Ipc according to the degree of confidence of the detection model that detected the candidate area Pc. Here, the candidate area information Ipc may indicate a circular or oval contour line indicating a candidate area Pc, or may indicate a solid area to be superimposed on the candidate area Pc. Further, the candidate area information Ipc may be displayed by various colors, shapes, and color densities. In this way, the display mode information D3 includes, for example, information that specifies whether the candidate area information Ipc is to be displayed by a contour line or by a solid area according to the detection model or the degree of confidence, and information that specifies the color, shape, color density, and the like of the candidate area information Ipc.

(4) Functional Block

Figure 3:
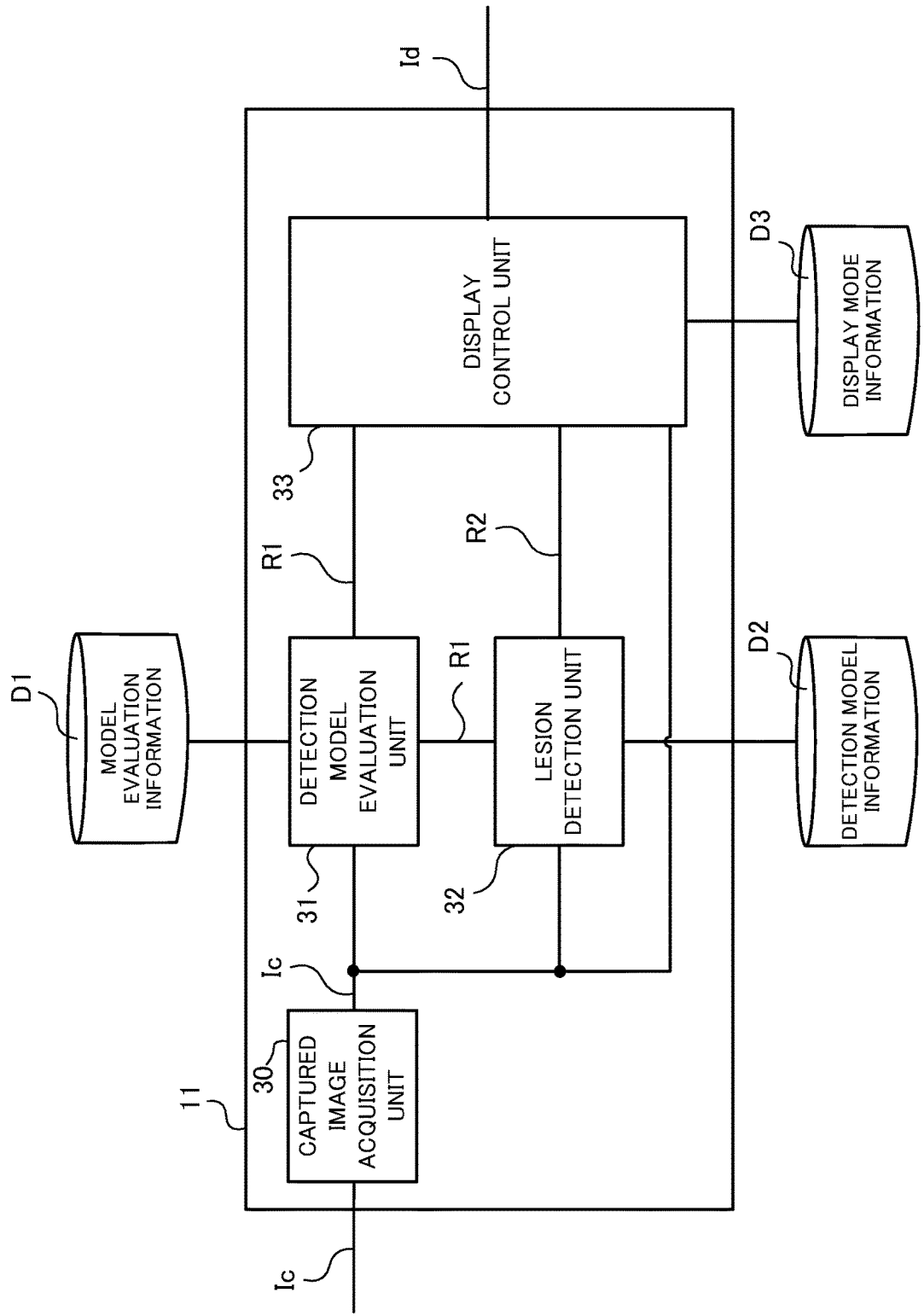
FIG. 3 illustrates a functional block of the image processing device.

FIG. 3 is a functional block diagram of the image processing device 1. As shown in FIG. 3, the processor 11 of the image processing device 1 functionally includes a captured image acquisition unit 30, a detection model evaluation unit 31, a lesion detection unit 32, and a display control unit 33.

The captured image acquisition unit 30 acquires the captured image Ic taken by the endoscope 3 via the interface 13 at predetermined intervals. Then, the captured image acquisition unit 30 supplies the acquired captured image Ic to the detection model evaluation unit 31, the lesion detection unit 32 and the display control unit 33, respectively.

On the basis of the captured image Ic supplied from the captured image acquisition unit 30, the detection model evaluation unit 31 evaluates the suitability of the respective detection models that can be configured by referring to the detection model information D2, and supplies the evaluation result "R1" to the display control unit 33. In this case, the detection model evaluation unit 31 configures the evaluation models by referring to the model evaluation information D1, and inputs the captured image Ic to each configured evaluation model, thereby generating the evaluation result R1. Here, for example, the evaluation result R1 includes: information indicative of the detection model (also referred to as "suitable detection model") which is evaluated to be appropriate for the detection of the lesion based on the inputted captured image Ic; and the degree of confidence which indicates the degree of confidence that each detection model is an appropriate model. In another example, the evaluation result R1 may only include information indicative of the suitable detection model.

Here, there may be one or more suitable detection models indicated by the evaluation result R1. For example, the detection model evaluation unit 31 determines the detection model having the highest degree of confidence as a suitable detection model. In another example, the detection model evaluation unit 31 determines one or more detection models whose degrees of confidence are equal to or greater than a predetermined threshold value as suitable detection models. In still another example, the detection model evaluation unit 31 determines the detection models having the top predetermined number of degrees of confidence as suitable detection models.

On the basis of the captured image Ic supplied from the captured image acquisition unit 30 and the evaluation result R1 supplied from the detection model evaluation unit 31, the lesion detection unit 32 detects the candidate area Pc that is a candidate for the lesion area in the captured image Ic, and supplies the detection result "R2" to the display control unit 33. In this case, by referring to the detection model information D2, the lesion detection unit 32 configures one or more suitable detection models indicated by the evaluation result R1, and inputs the captured image Ic to the configured suitable detection models to generate the detection result R2. Here, the detection result R2 includes, for example, information indicating an area in the captured image Ic corresponding to the candidate area Pc. When there are two or more suitable detection models, the lesion detection unit 32 generates detection result R2 indicating candidate areas Pc detected by the two or more suitable detection models.

The display control unit 33 generates a display information Id to be displayed on the display device 2 based on the captured image Ic, the evaluation result R1, and the detection result R2. In this case, the display control unit 33 generates the candidate area information Ic for specifying the candidate area Pc on the captured image Ipc, and generates the display information Id for displaying the generated candidate area information Ipc on the captured image Ic. Further, the display control unit 33 determines, by referring to the display mode information D3, the display mode of the candidate area information Ipc. In this case, in the first example, the display control unit 33 refers to the display mode information D3 that defines the display mode of the candidate area information Ipc for each detection model, and displays the candidate area information Ipc indicative of the candidate are Pc detected by the suitable detection model on the captured image Ic in a superimposed manner. In this case, the display control unit 33 displays the candidate area information Ipc superimposed on the captured image Ic according to the display mode associated with the suitable detection model in the display mode information D3. In the second example, the display control unit 33 refers to the display mode information D3 that defines the display mode of the candidate area information Ipc for each degree (level) of confidence, and displays the candidate area information Ipc indicative of the candidate area Pc detected by the suitable detection model on the captured image Ic in a superimposed manner. In this case, the display control unit 33 displays the candidate area information Ipc on the captured image Ic according to the display manner corresponding to the degree of confidence indicated by the evaluation result R1 regarding the suitable detection model. Specific display examples of the candidate area information Ipc will be described later.

Each component of the captured image acquisition unit 30, the detection model evaluation unit 31, the lesion detection unit 32, and the display control unit 33 described in FIG. 3 can be realized by the processor 11 executing a program, for example. More specifically, each component may be implemented by the processor 11 executing a program stored in the memory 12. In addition, the necessary program may be recorded in any non-volatile storage medium and installed as necessary to realize the respective components. In addition, at least a part of these components is not limited to being realized by a software program and may be realized by any combination of hardware, firmware, and software. At least some of these components may also be implemented using user-programmable integrated circuitry, such as FPGA (Field-Programmable Gate Array) and microcontrollers. In this case, the integrated circuit may be used to realize a program for configuring each of the above-described components. In this way, each component may be implemented by a variety of hardware other than a processor. The above is true for other example embodiments to be described later.

(5) Concrete Example

Next, a specific example of the process based on the functional block shown in FIG. 3. In the following specific examples, for convenience of explanation, it is assumed that the detection model information D2 includes parameters for configuring the first detection model, the second detection model, and the third detection model.

Figure 4A:
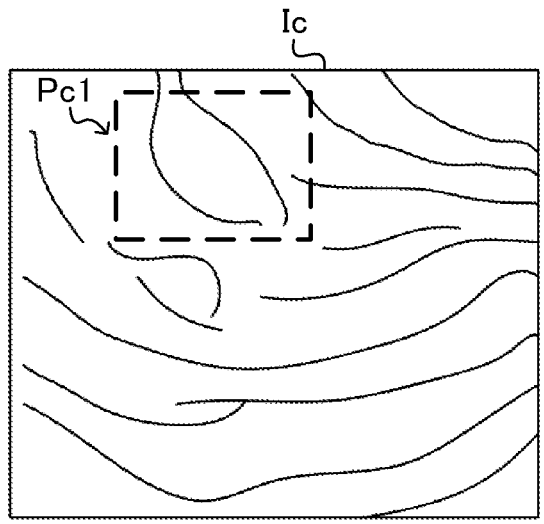
FIG. 4A illustrates a captured image with an explicit indication of a candidate area detected by a first detection model from the captured image.
Figure 4B:
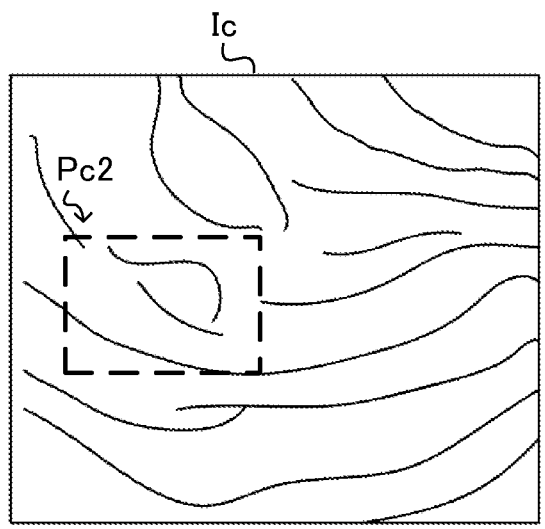
FIG. 4B illustrates the captured image with an explicit indication of a candidate area detected by a second detection model from the captured image.
Figure 4C:
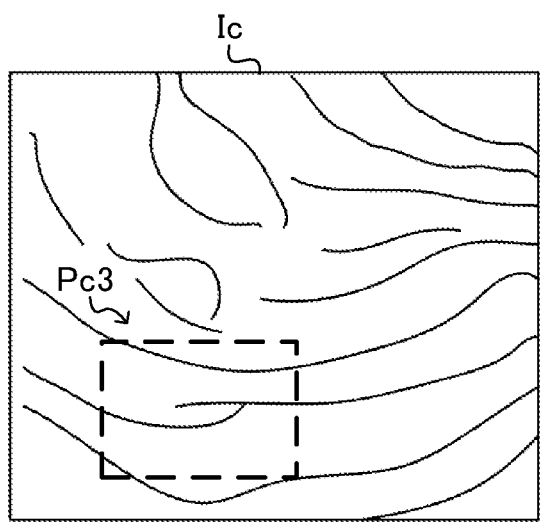
FIG. 4C illustrates the captured image with an explicit indication of a candidate area detected by a third detection model from the captured image.

FIG. 4A illustrates a captured image Ic with explicit indication of a first candidate area "Pc1" that is a candidate area Pc detected by the first detection model from the captured image Ic. FIG. 4B illustrates the captured image Ic with explicit indication of a second candidate area "Pc2" that is a candidate area Pc detected by the second detection model from the captured image Ic. FIG. 4C illustrates the captured image Ic with explicit indication of a third candidate area "Pc3" that is a candidate area Pc detected by the third detection model from the captured image Ic. In FIGS. 4A to 4C, for convenience of explanation, the positions of the respective candidate areas Pc1 to Pc3 are indicated by broken line frame. The first detection model to the third detection model are image property dependent detection models or state dependent detection models different from one another, and detect the first candidate area Pc1 to the third candidate area Pc3 which are different areas in the captured image Ic, respectively.

FIG. 5 shows a first display example of a display screen image the display device 2 displays in endoscopic inspection. In the first display example, the image processing device 1 defines the detection model having the highest evaluation by the detection model evaluation unit 31 as the suitable detection model, and clearly indicates the detection result by the display mode associated with the suitable detection model.

As shown in FIG. 5, the display control unit 33 of the image processing device 1 generates the first candidate area information "Ipc1", which is a candidate area information Ipc indicative of the first candidate area Pc1, and displays the first candidate area information Ipc1 on the first candidate area Ic in a superimposed manner on the display device 2. Further, the display control unit 33 clearly indicates, in the margin area adjacent to the captured image Ic in the display screen image, that the first candidate area information Ipc1 is an area suspected as a lesion area.

In this case, the detection model evaluation unit 31 of the image processing device 1 performs evaluation on each suitability of the first to third detection models for the captured image Ic based on the evaluation model configured by referring to the model evaluation information D1. The detection model evaluation unit 31 generates the evaluation result R1 which indicates that the first detection model having the highest evaluation is used as the suitable detection model. Then, the lesion detection unit 32 generates the detection result R2 indicating the first candidate area Pc1 based on the first detection model configured by referring to the detection model information D2. Then, the display control unit 33 generates a first candidate area information Ipc1 for specifying the first candidate area Pc1 on the captured image Ic.

Here, the process regarding the first display example by the display control unit 33 will be specifically described. In the first display example, the display control unit 33 generates the first candidate area information Ipc1 according to the display mode associated with the first detection model in the display mode information D3. For example, the first detection model is a state dependent detection model for detecting a flat lesion whose boundaries are difficult to identify, and the display mode information D3 includes information indicating that the detection result of the first detection model should be displayed by a solid area without a contour line. In this case, the display control unit 33 refers to the display mode information D3, and displays the first candidate area information Ipc1 indicating the detection result from the first detection model by the solid area without a contour line. For example, in this case, the output from the first detection model is a reliability map, and the display control unit 33 generates the first candidate area information Ipc1 for filling in the pixel area whose reliability outputted from the first detection model is equal to or higher than a predetermined degree. It is noted that the solid area may have a predetermined transmittance so that the superimposed area in the captured image Ic is visible.

Thus, in the first display example, the image processing device 1 can suitably display the detection result by the most suitable detection model according to the appropriate display mode associated with the most suitable detection model.

Figure 6:
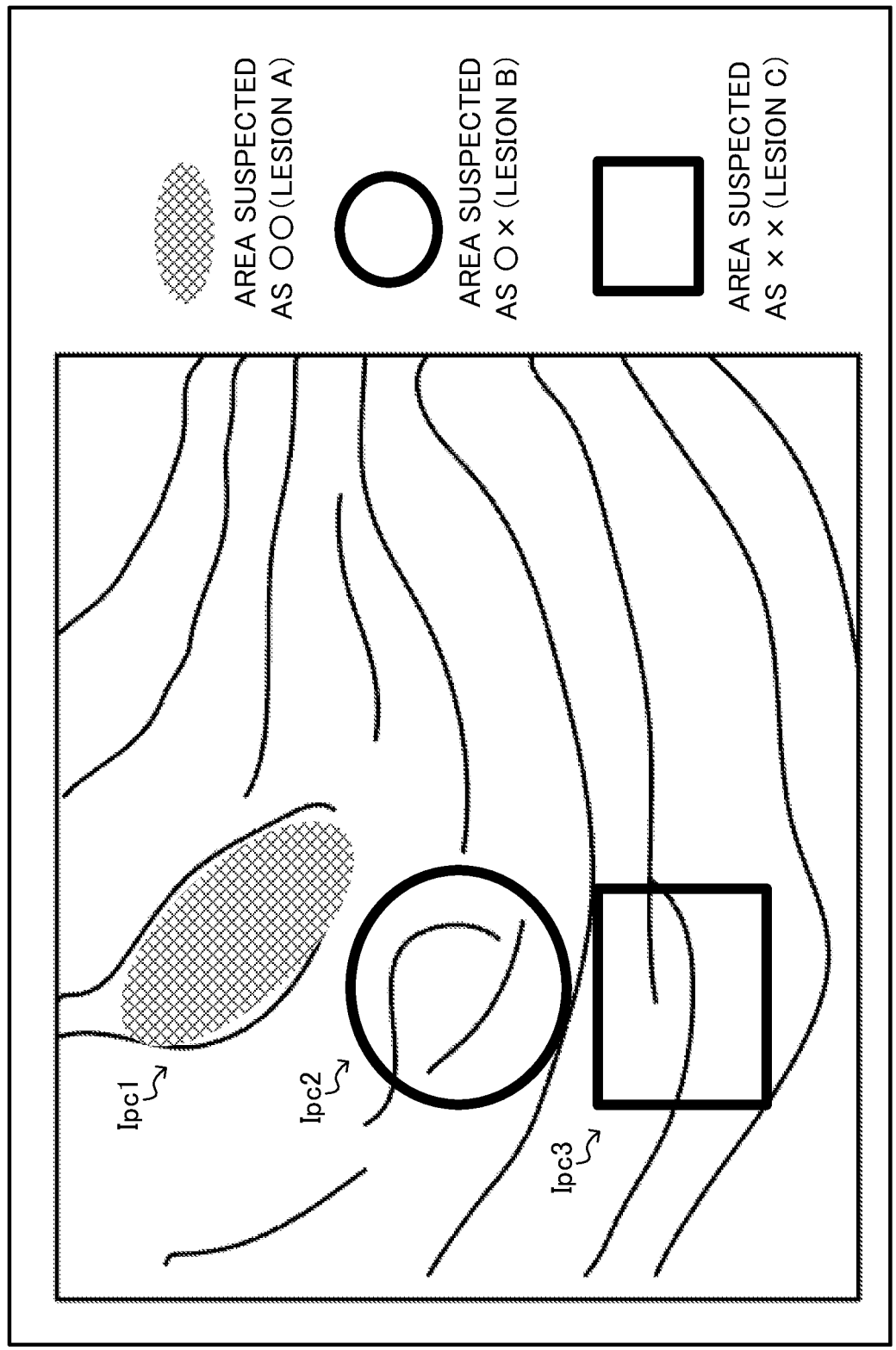
FIG. 6 illustrates a second display example of the display screen image displayed by a display device in endoscopic inspection.

FIG. 6 shows a second display example of a display screen image displayed by the display device 2. In the second display example, the image processing device 1 determines the detection models having the top three degrees of confidence as the suitable detection models, and displays the detection result by each suitable detection model according to a display mode associated with each suitable detection model.

As shown in FIG. 6, the display control unit 33 generates the first candidate area information Pc1 to the third candidate area information Pc3, which are candidate area information Ipc that clearly indicate the first candidate area Ipc1 to the third candidate area information Ipc3, and superimposes the first candidate area information Ipc1 to the third candidate area information Ipc3 on the first candidate area Pc1 to the third candidate area Pc3 in the captured image Ic, respectively and displays them on the display device 2.

In this case, the detection model evaluation unit 31 evaluates each suitability of the first to third detection models from the captured image Ic based on the evaluation model configured by referring to the model evaluation information D1, and generates the evaluation result R1 which indicates that the first detection model to the third detection model with top three degrees of confidence are the suitable detection models. Then, the lesion detection unit 32 processes the captured image Ic based on the first detection model to the third detection model that are configured by referring to the detection model information D2, thereby generating the detection result R2 indicating the first candidate area Pc1 to the third candidate area Pc3. Then, the display control unit 33 generates the first candidate area information Ipc1 to the third candidate area information Ipc3 for displaying the first candidate area Pc1 to the third candidate area Pc3 on the captured image Ic.

In the second display example, the display control unit 33 refers to the display mode information D3 and generates the first candidate area information Ipc1 to the third candidate area information Ipc3 according to display modes associated with the first detection model to the third detection model, respectively. Here, the first detection model to the third detection model are the state dependent detection models for detecting the lesions A to C, respectively, and appropriate display modes according to the shapes (flat shape, raised shape, etc.,) of the lesions A to C are defined in the display mode information D3.

In this case, with reference to the display mode information D3, the display control unit 33 displays a solid area without a contour line as the first candidate area information Ipc1, a round contour line as the second candidate area information Ipc2, and a rectangular contour line as the third candidate area information Ipc3. For example, when the output from the second detection model is the reliability map, the display control unit 33 generates a line along the smallest circle surrounding the pixel area whose reliability outputted by the second detection model is equal to or higher than a predetermined degree as the second candidate area information Ipc2. In another example, when the second detection model outputs a coordinate value indicating the center position of the lesion area, the display control unit 33 generates a line along a predetermined-size circle centered on the coordinate value outputted by the second detection model as the second candidate area information Ipc2. Further, the display control unit 33 can generate the third candidate area information Ipc3 in the same manner as the second candidate area information Ipc2.

Further, with reference to the display mode information D3, the display control unit 33 clearly displays the names of the lesions of the first candidate area Pc1 to the third candidate area Pc3 in association with the first candidate area information Ipc1 to the third candidate area information Ipc3 in the margin area adjoining the captured image Ic in the display screen image. In this case, the display mode information D3 includes information indicating the names of the lesion areas to be detected by the respective detection models. The display of information indicating the names of the lesion areas in the margin area as in this example is optional and it may not be performed.

Accordingly, in the second display example, when displaying the detection results by a plurality of detection models, the image processing device 1 can suitably display each detection result according to an appropriate display mode associated with each detection model.

Figure 7:
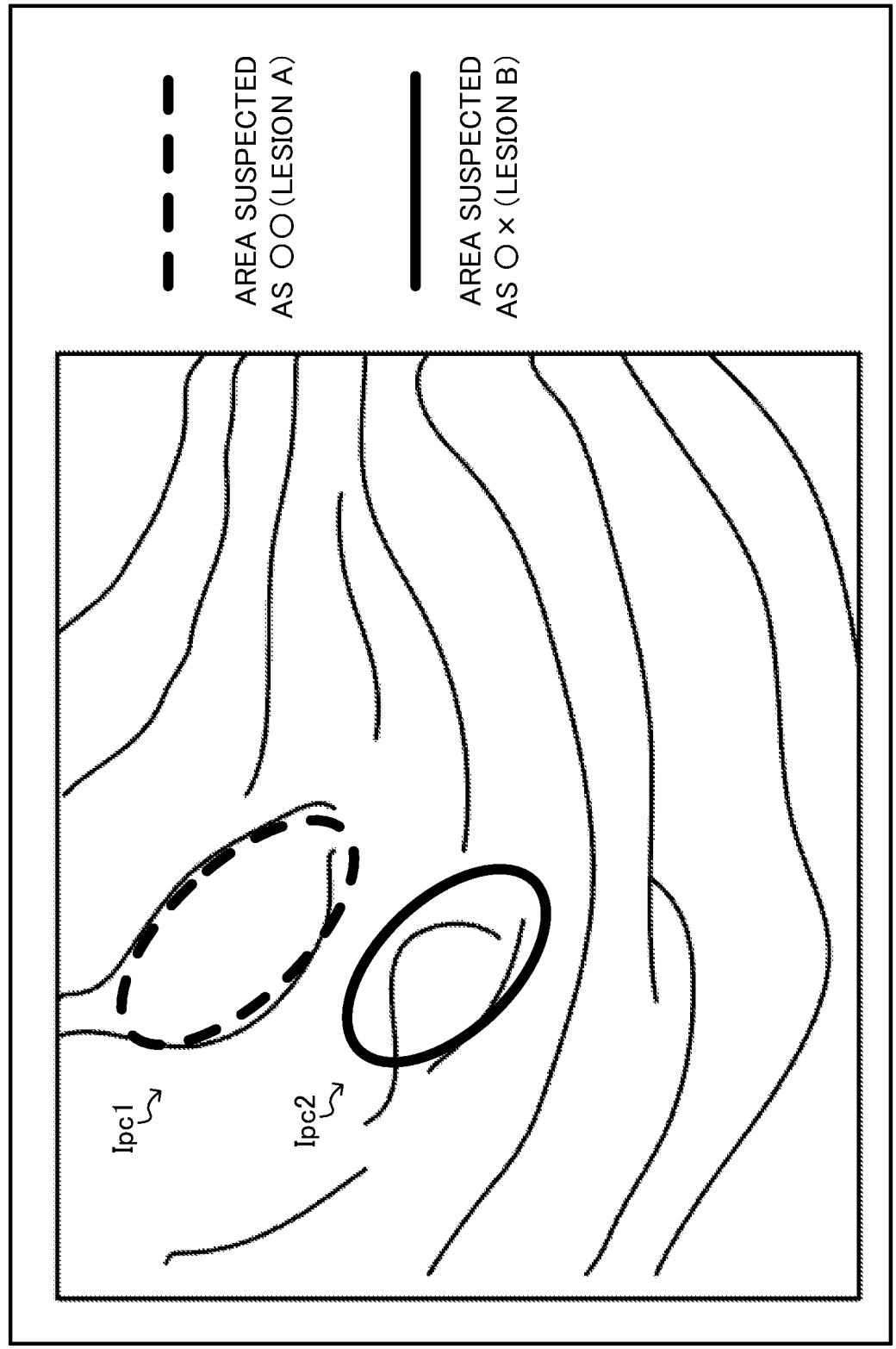
FIG. 7 illustrates a third display example of the display screen image displayed by a display device in endoscopic inspection.

FIG. 7 shows a third display example of a display screen image displayed by the display device 2. In the third display example, the image processing device 1 determines one or more suitable detection models to be one or more detection models whose degrees of confidence are equal to or higher than a threshold value, and displays each suitable detection model according to a display mode associated with each suitable detection model.

In the third display example, the detection model evaluation unit 31 evaluates each suitability of the first to third detection models based on the captured image Ic, and generates an evaluation result R1 which indicates that the first detection model and the second detection model whose calculated degrees of confidence are equal to or higher than the threshold value are suitable detection models. Then, on the basis of the first detection model and the second detection model configured with reference to the detection model information D2, the lesion detection unit 32 generates the detection result R2 indicating the first candidate area Pc1 and the second candidate area Pc2. Then, the display control unit 33 generates the first candidate area information Ipc1 and the second candidate area information Ipc2 for specifying the first candidate area Pc1 and the second candidate area Pc2 on the captured image Ic.

Here, in the third display example, the display mode information D3 specifies broken lines to draw the contour line as a display mode corresponding to the first detection model, and specifies solid lines to draw the contour line as a display mode corresponding to the second detection model. Therefore, with reference to the display mode information D3, the display control unit 33 displays the first candidate area information Ipc1 which circles the first candidate area Pc1 by broken line, and displays the second candidate area information Ipc2 which circles the second candidate area Pc2 by solid line.

Accordingly, in the third display example, the image processing device 1 can suitably display the detection result of each suitable detection model using an appropriate line type associated with the each detection model in the display mode information D3. Similarly, the image processing device 1 may display the detection result of each suitable detection models using an appropriate color associated with the each detection model in the display mode information D3.

Figure 8:
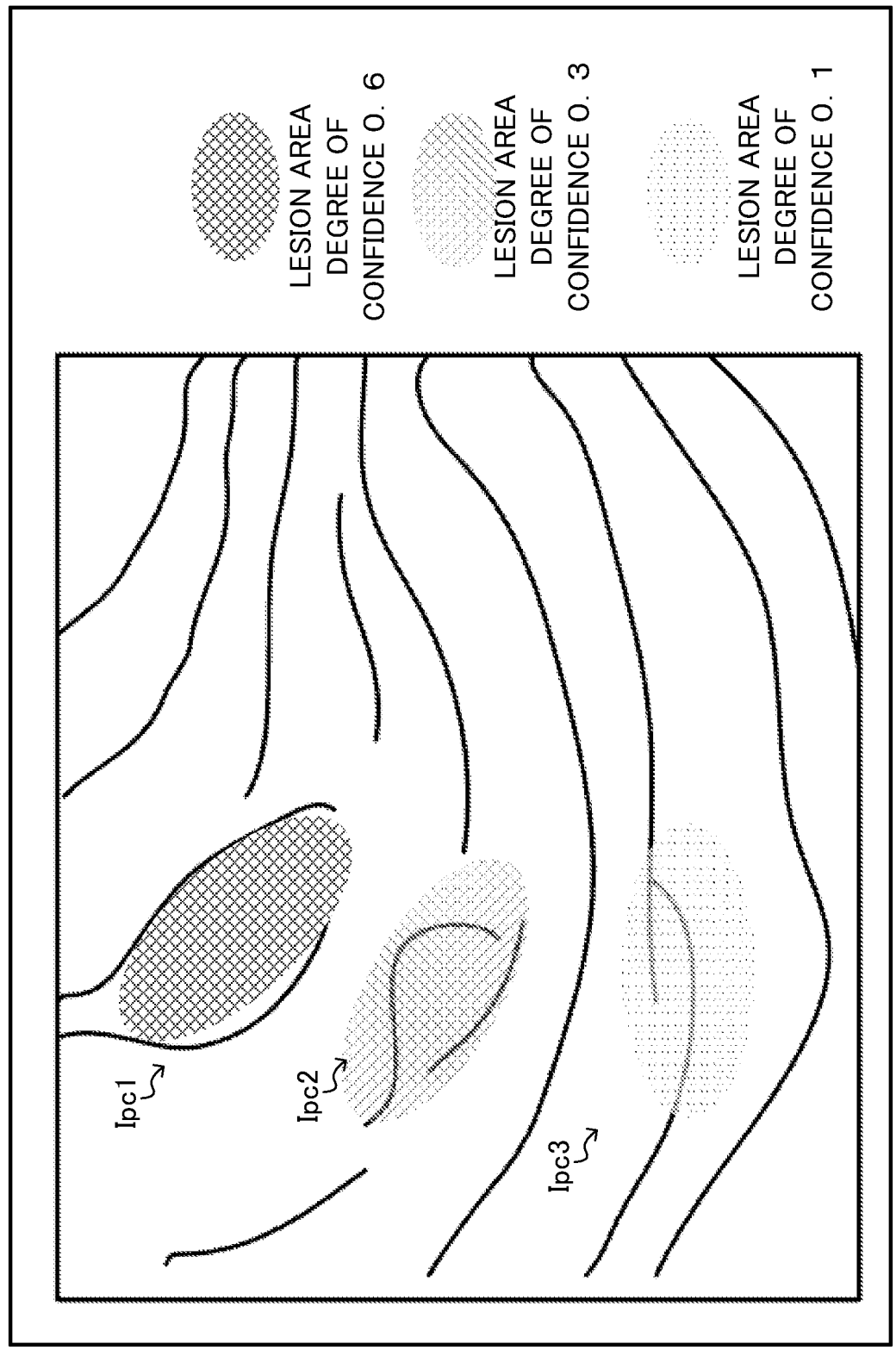
FIG. 8 illustrates a fourth display example of the display screen image displayed by a display device in endoscopic inspection.

FIG. 8 shows a fourth display example of a display screen image displayed by the display device 2. In the fourth display example, when displaying the detection result of each detection model according to the display mode corresponding to the degree of confidence of each detection model, the image processing device 1 determines the density (color density) of the candidate area information Ipc indicating the detection result according to the degree of confidence of the each detection model.

In the fourth display example, the detection model evaluation unit 31 calculates the degrees of confidence of the first to third detection models based on the captured image Ic, and the lesion detection unit 32 uses the first detection model to the third detection model as suitable detection models and specifies the first candidate area Pc1 to the third candidate area Pc3 by using respective detection models. Then, the display control unit 33 generates the first candidate area information Ipc1 to the third candidate area information Ipc3 which indicate solid areas for specifying the first candidate area Pc1 to the third candidate area Pc3 on the captured image Ic.

In this case, the display control unit 33 displays the candidate area information Ipc so that the density of candidate area information Ipc indicative of a candidate area increases with increasing degree of confidence of the suitable detection model which detected the candidate area. Specifically, the display control unit 33 displays the first candidate area information Ipc1 representing the detection result of the first detection model having the highest degree of confidence "0.6" in the darkest color, and displays the third candidate area information Ipc3 representing the detection result of the third detection model having the lowest degree of confidence "0.1" in the lightest color. Further, in the margin area adjacent to the captured image Ic in the display screen image, the display control unit 33 clearly indicates the degrees of confidence of the detection models which detected the first candidate area Pc1 to the third candidate area Pc3 in association with the corresponding first candidate area information Ipc1 to the third candidate area information Ipc3.

Accordingly, in the fourth display example, the display control unit 33 can suitably increase the conspicuity of a candidate area Pc on the captured image Ic with increase in the degree of confidence of the detection model which detected the candidate area Pc.

Figure 9:
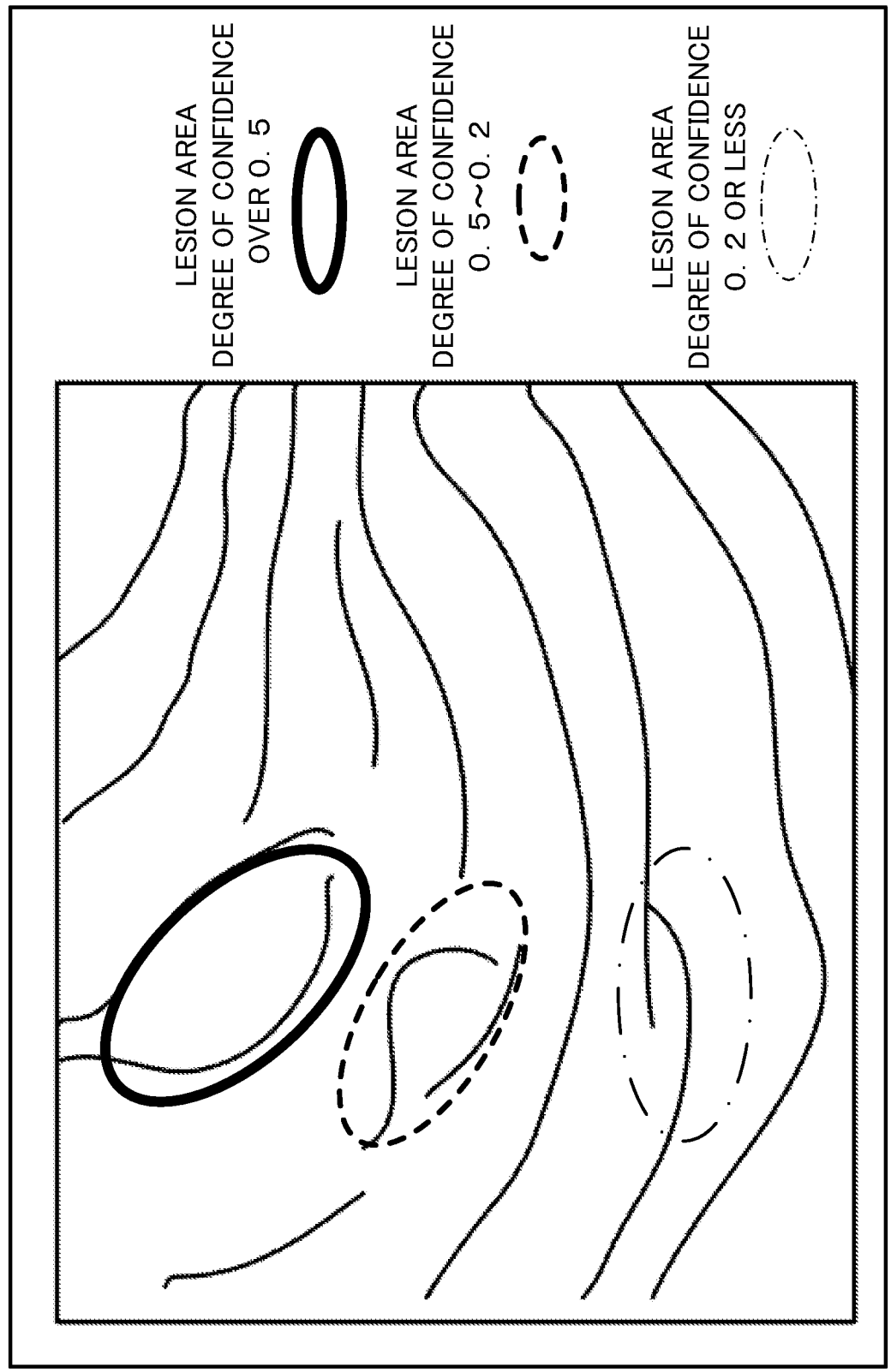
FIG. 9 illustrates a fifth display example of the display screen image displayed by a display device in endoscopic inspection.

FIG. 9 shows a fifth display example of a display screen image displayed by the display device 2. In the fifth display example, when displaying the detection result of each detection model according to the display mode corresponding to the degree of confidence of each detection model, the image processing device 1 determines the display mode of the contour line surrounding the detection result according to the degree of confidence of each detection model.

In the fifth display example, the detection model evaluation unit 31 calculates the degrees of confidence of the first to third detection models based on the captured image Ic, and the lesion detection unit 32 determines the first detection model to the third detection model as the suitable detection model and specifies the first candidate area Pc1 to the third candidate area Pc3 by using the respective detection models. Then, the display control unit 33 generates the first candidate area information Ipc1 to the third candidate area information Ipc3 which are contour lines for specifying the first candidate area Pc1 to the third candidate area Pc3 on the captured image Ic.

In this case, the display control unit 33 displays candidate area information Ipc so that the line of the candidate area information Ipc becomes more conspicuous in terms of the line width and the line style with increasing degree of confidence of the suitable detection model which corresponds to the candidate area information Ipc. Specifically, the display control unit 33 displays the first candidate area information Ipc1 which indicates the detection result by the first detection model having the highest degree of confidence "0.6" by using a solid contour line with the thickest line width. On the other hand, the display control unit 33 displays the third candidate area information Ipc3 which indicates the detection result by the third detection model having the lowest degree of confidence "0.1" by using one-dot chain contour line with the thinnest line width. Further, in the margin area adjacent to the captured image Ic in the display screen image, the display control unit 33 clearly indicates the correspondence between the degree of confidence of each detection model and the display mode of the candidate area information Ipc (in this case, the line style of the contour line).

Accordingly, even in the fifth display example, in the same way as the fourth display example, the display control unit 33 can suitably display candidate areas Pc on the captured image Ic so that the conspicuity of a candidate area Pc increases with increasing degree of confidence of the detection model which detected the candidate area Pc.

(6) Processing Flow

Figure 10:
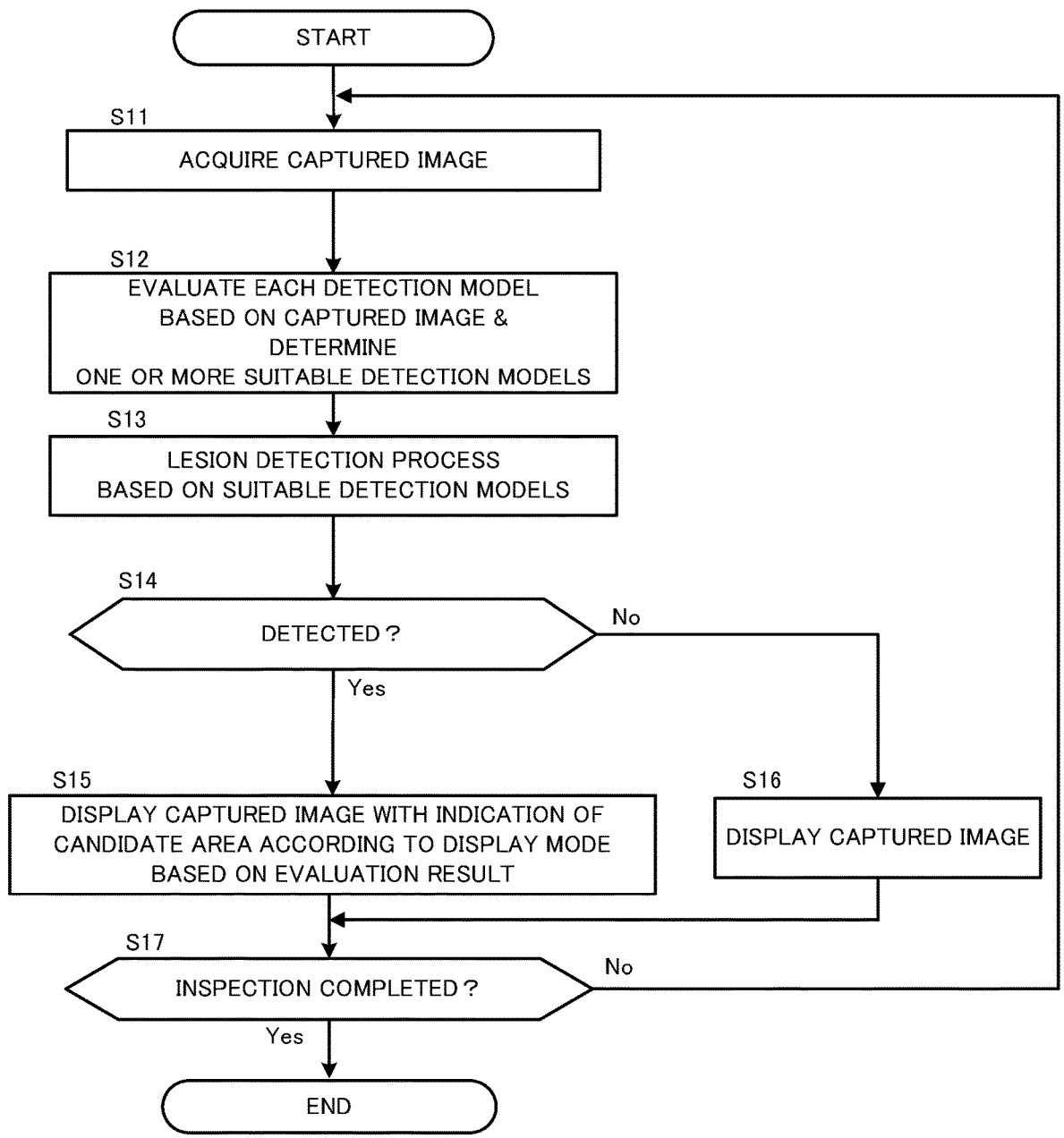
FIG. 10 is an example of a flowchart showing an outline of a display process executed by the image processing device during endoscopic inspection according to the first example embodiment.

FIG. 10 is an example of a flowchart showing an outline of a display process performed by the image processing device 1 during endoscopic inspection in the first example embodiment.

First, the image processing device 1 acquires the captured image Ic (step S11). In this case, the captured image acquisition unit 30 of the image processing device 1 receives the captured image Ic from the endoscope 3 via the interface 13.

Next, the image processing device 1 evaluates each detection model based on the captured image Ic and determines one or more suitable detection models (step S12). In this case, the detection model evaluation unit 31 of the image processing device 1 inputs the captured image Ic to the evaluation model configured by referring to the model evaluation information D1, and determines the suitable detection models based on the output result from the evaluation model. In this case, the suitable detection models may be one detection model having the highest degree of confidence, or may be one or more detection models whose degree of confidence outputted by the evaluation model is equal to or greater than a threshold value, or may be one or more detection models corresponding to top predetermined number of degrees of confidence.

Next, the image processing device 1 performs a lesion detection process by the suitable detection models (step S13). In this case, the lesion detection unit 32 of the image processing device 1 configures each suitable detection model by referring to the detection model information D2, and inputs the captured image Ic to each configured suitable detection model, thereby generating the detection result R2 relating to the candidate areas Pc in the captured image Ic.

Then, the image processing device 1 determines whether or not any candidate area Pc is detected at step S13 (step S14). When the image processing device 1 does not detect any candidate area Pc at step S13 (step S14; No), the display control unit 33 of the image processing device 1 displays the captured image Ic on the display device 2 (step S16). In this case, since there is no area in the imaging range to be a candidate of the lesion area, the display control unit 33 displays the captured image Ic as it is on the display device 2.

On the other hand, when the candidate area Pc is detected (step S14; Yes), the image processing device 1 displays, on the display device 2, the captured image Ic with explicit indication of the candidate area R1 according to the display mode based on the evaluation result R1 by the detection model evaluation unit 31 (step S15). In this case, by referring to the display mode information D3, the display control unit 33 generates candidate area information Ipc according to a display mode corresponding to the detection model used for detecting the candidate area Pc or the degree of confidence thereof. Then, the display control unit 33 generates display information Id for displaying the candidate area information Ipc superimposed on the captured image Ic, and supplies the generated display information Id to the display device 2 via the interface 13. Thus, the display control unit 33 can appropriately display each candidate area Pc on the captured image Ic according to the display mode determined based on the detection model used to detect each candidate area Pc or the degree of confidence of the detection model used to detect each candidate area Pc.

After the process at step S15 or step S16, the image processing device 1 determines whether or not the endoscopic inspection has been completed (step S17). For example, the image processing device 1 determines that the endoscopic inspection has ended when a predetermined input or the like by the input unit 14 or the operation unit 36 is detected. Then, if it is determined that the endoscopic inspection has been completed (step S17; Yes), the image processing device 1 ends the process of the flowchart. On the other hand, if it is determined that the endoscopic inspection has not been completed (step S17; No), the image processing device 1 gets back to the process step S11. Then, the image processing device 1 executes the processes at step S11 to the step S17 for the captured image Ic newly generated by the endoscope 3.

(7) Modifications

Next, modifications suitable for the above-described example embodiment will be described. The following modifications may be applied in combination to the example embodiments described above.

First Modification

The lesion detection unit 32 may detect the lesion area using all the detection models that can be configured by the detection model information D2 regardless of the evaluation result R1 generated by the detection model evaluation unit 31.

Figure 11:
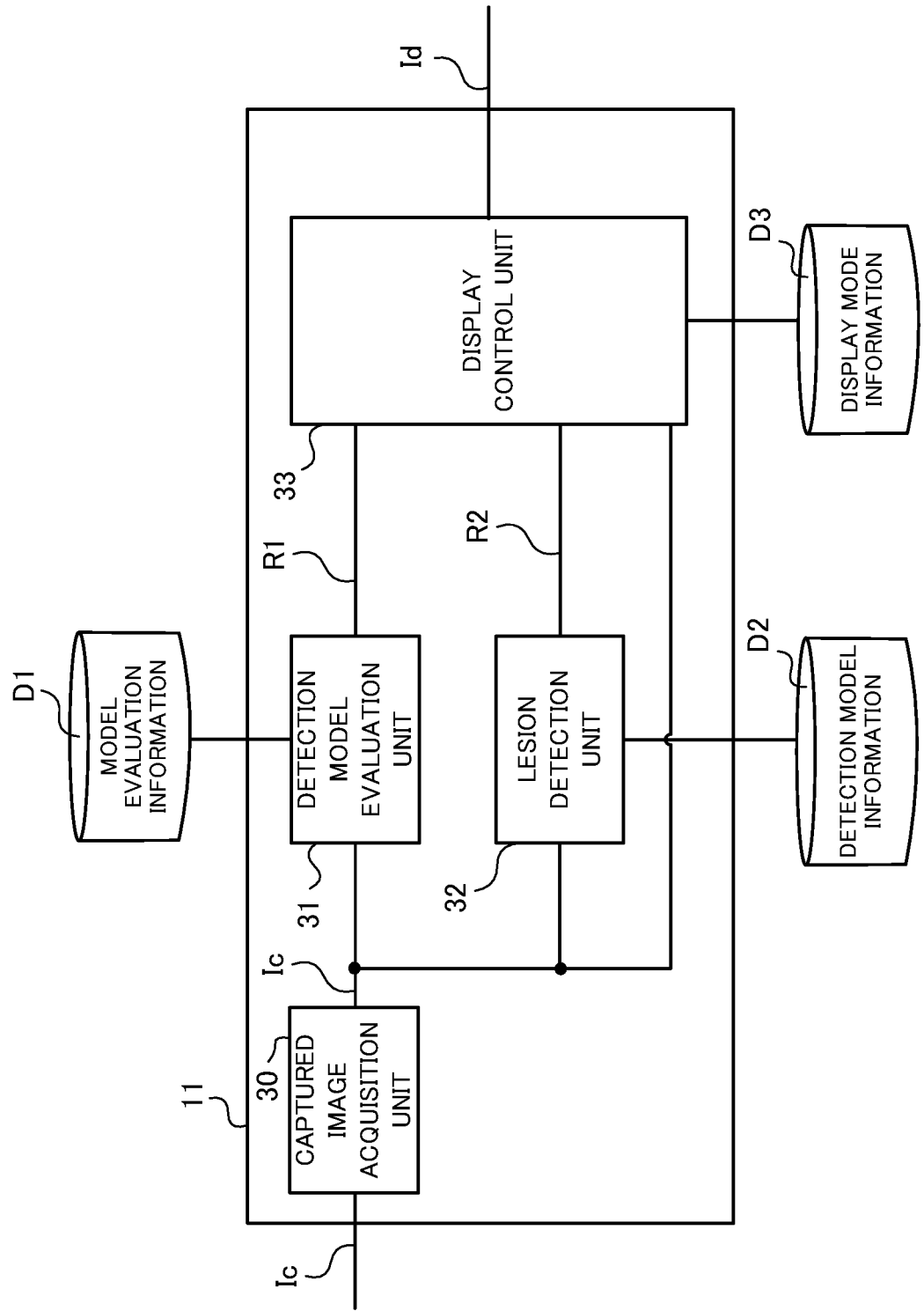
FIG. 11 is an example of a functional block of the image processing device according to a modification.

FIG. 11 shows an example of a functional block of the processor 11 of the image processing device 1 according to the first modification. As shown in FIG. 11, in the present modification, the lesion detection unit 32 inputs the captured image Ic to all the configurable detection models by referring to the detection model information D2 regardless of the evaluation result R1 generated by the detection model evaluation unit 31, thereby generating the detection result R2. In addition, the detection model evaluation unit 31 supplies the evaluation result R1 indicating the degree of confidence for each of all the detection models that can be configured by the detection model information D2 to the display control unit 33. Then, the display control unit 33 generates candidate area information Ipc for specifying the candidate area Pc indicated by the detection result R2 according to a display mode corresponding to the degree of confidence for the detection model used for detecting the candidate area Pc. It is noted that the display mode of the candidate area information Ipc according to the degree of confidence is exemplified in, for example, FIGS. 8 and 9. Then, the display control unit 33 supplies the display information Id for superimposing and displaying the generated candidate area information Ipc on the captured image Ic to the display device 2.

As described above, even in this modification, the image processing device 1 can suitably display each candidate area on the captured image Ic according to the evaluation result of each detection model.

Second Modification

After displaying the captured image Ic on which the candidate area information Ipc is superimposed, the image processing device 1 may accept an input relating to whether or not the candidate area Pc indicated by the displayed candidate area information Ipc corresponds to an actual lesion area, and then learn the evaluation model based on the received input.

In this case, for example, when the captured image Ic on which the candidate area information Ipc is superimposed is displayed on the display device 2, the image processing device 1 receives, from the input unit 14, an input relating to whether or not the candidate area Pc indicated by the candidate area information Ipc corresponds to an actual lesion area. In this case, for example, the input unit 14 is a touch panel that is laminated to the display device 2, and the image processing device 1 identifies the detection model that detects the candidate area Pc that is a correct example (correct answer) by accepting the touch operation to specify the candidate area information Ipc that correctly points to the actual lesion area. It is noted that the image processing device 1 may identify the detection model that detects a candidate area Pc that is a negative example (incorrect answer) by accepting the touch operation to specify the candidate area information Ipc that does not indicate the actual lesion area correctly.

Then, the image processing device 1 learns the evaluation model by machine learning in which the correctness determination result of the detection model specified from the input signal generated by the input unit 14 is used as correct data, and the captured image Ic inputted to the detection model as sample data. In this case, the image processing device 1 updates the parameters of the evaluation model so that the error (loss) between the output from the evaluation model and the correct answer is minimized. The algorithm for determining the parameters described above to minimize loss may be any learning algorithm used in machine learning, such as a gradient descent method and an error back-propagation method. Then, the image processing device 1 stores the parameters of the updated evaluation model in the memory 12 as model evaluation information D1.

According to this modification, the image processing device 1 can appropriately learn and update the model evaluation information D1.

Third Modification

The image processing device 1 may process, after the endoscopic inspection, a video configured by the captured images Ic generated during the endoscopic inspection.

For example, at an arbitrary timing after the inspection, the image processing device 1 performs the evaluation process and the lesion detection process at step S12 and step S13 shown in FIG. 10 for each captured image Ic constituting the video when the video to be processed is specified based on the user input by the input unit 14 or the like. When the candidate area Pc serving as a candidate area for the lesion area is detected, the image processing device 1 superimposes the candidate area information Ipc, which is generated based on the process at step S15, on the captured image Ic in which the candidate area Pc is detected and displays it on the display device 2.

Fourth Modification

The model evaluation information D1, the detection model information D2, and the display mode information D3 may be stored in a storage device separated from the image processing device 1.

Figure 12:
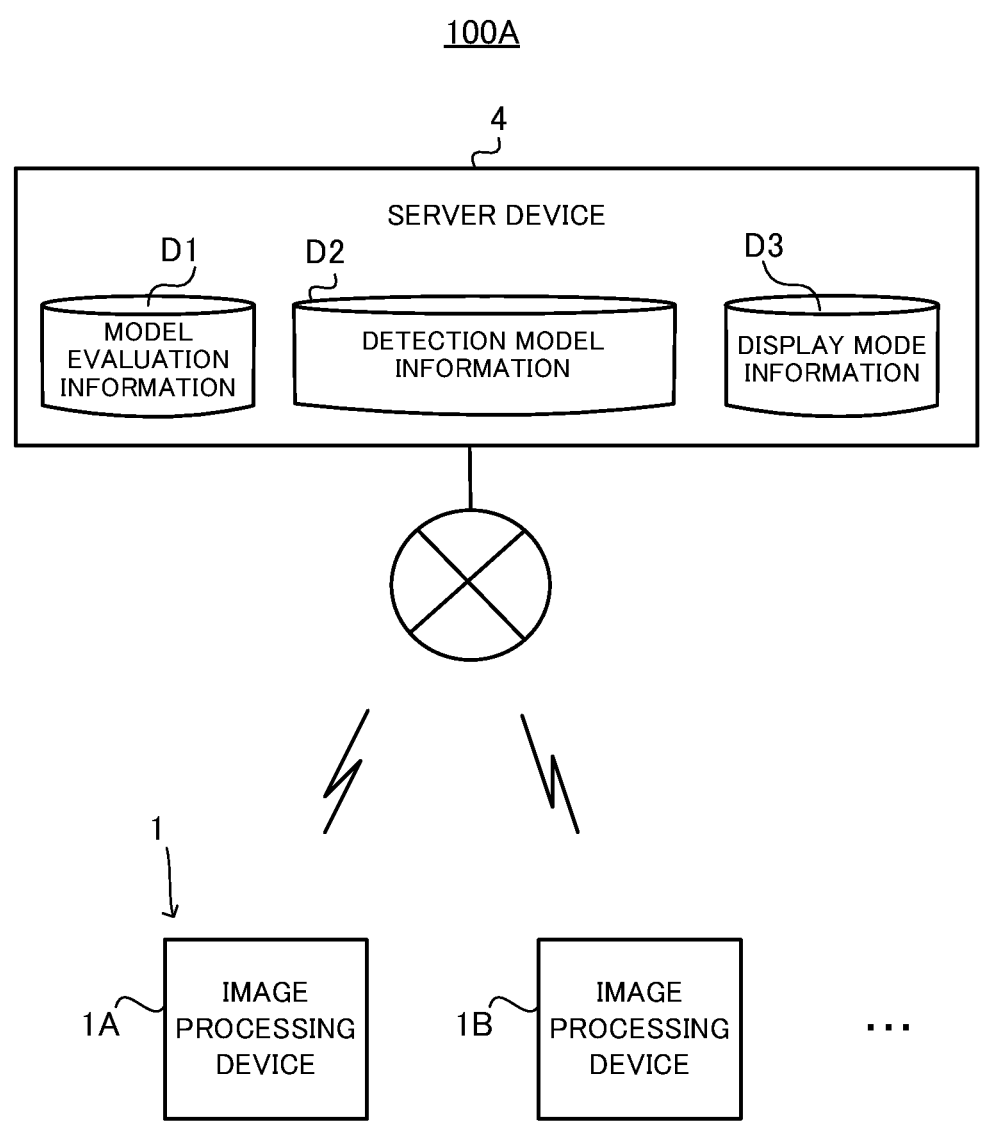
FIG. 12 illustrates a schematic configuration of the endoscopic inspection system in a modification.

FIG. 12 is a schematic configuration diagram of an endoscopic inspection system 100A according to the fourth modification. For simplicity, the display device 2 and the endoscope 3 are not shown in FIG. 12. The endoscopic inspection system 100A shown in FIG. 12 includes a server device 4 that stores model evaluation information D1, detection model information D2, and display mode information D3. The endoscopic inspection system 100A also includes a plurality of image processing devices 1 (1A, 1B, . . . ) capable of data communication with the server device 4 via a network.

In this case, the image processing devices 1 refer to the model evaluation information D1, the detection model information D2, and the display mode information D3 through the network. In this case, the interface 13 of each image processing device 1 includes a communication interface such as a network adapter for performing the data communication. In this configuration, as in the above-described example embodiment, the image processing devices 1 can suitably display the captured image Ic in which the candidate area Pc is clearly indicated by referring to the model evaluation information D1, the detection model information D2, and the display mode information D3.

Fifth Modification

The object to be detected by the detection model is not limited to the lesion area, and it may be any attention area that the inspector needs to be noticed. Examples of such an attention area include a lesion area, an inflammation area, a point with an operating mark or other cuts, an area with a fold or a protrusion, an area on the wall surface of the lumen where the pointed end unit 38 of the endoscope 3 tends to get contact (caught).

Second Example Embodiment

Figure 13:
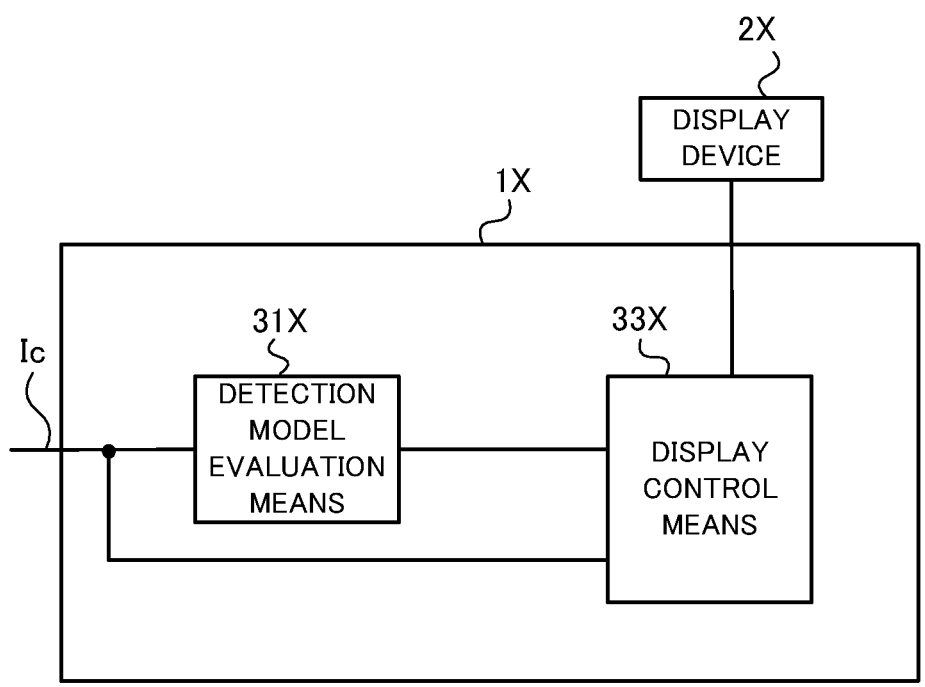
FIG. 13 is a block diagram of the image processing device according to the second example embodiment.

FIG. 13 is a block diagram of the image processing device 1X according to the second example embodiment. The image processing device 1X includes a detection model evaluation means 31X and a display control means 33X.

The detection model evaluation means 31X is configured to perform an evaluation on suitability of a detection model for detecting an attention area to be noted based on a captured image "Ic" in which an inspection target is photographed by a photographing unit provided in an endoscope. Examples of the detection model evaluation means 31X include the detection model evaluation unit 31 in the first example embodiment. The detection model evaluation means 31X may immediately acquire the captured image Ic generated by the photographing unit, or may acquire, at a predetermined timing, the captured image Ic generated in advance by the photographing unit and stored in the storage device.

The display control means 33X is configured to display candidate area information according to a display mode determined based on a result of the evaluation, the candidate area information indicating one or more candidate areas that are one or more candidates of the attention area, the candidate areas being detected by one or more detection models included in detection model(s) subjected to the evaluation, the candidate area information being superimposed on the captured image Ic which is displayed by a display device 2X. Examples of the display control means 33X may be the display control unit 33 in the first example embodiment. Examples of the "one or more detection models" include the "suitable detection models" in the first example embodiment. It is noted that the "one or more detection models" may be identical to the "detection model(s) subjected to the evaluation" or may be a part of the "detection model(s) subjected to the evaluation". In the former case, the "one or more detection models" and the "detection model(s) subjected to the evaluation" may be a same single detection model.

Figure 14:
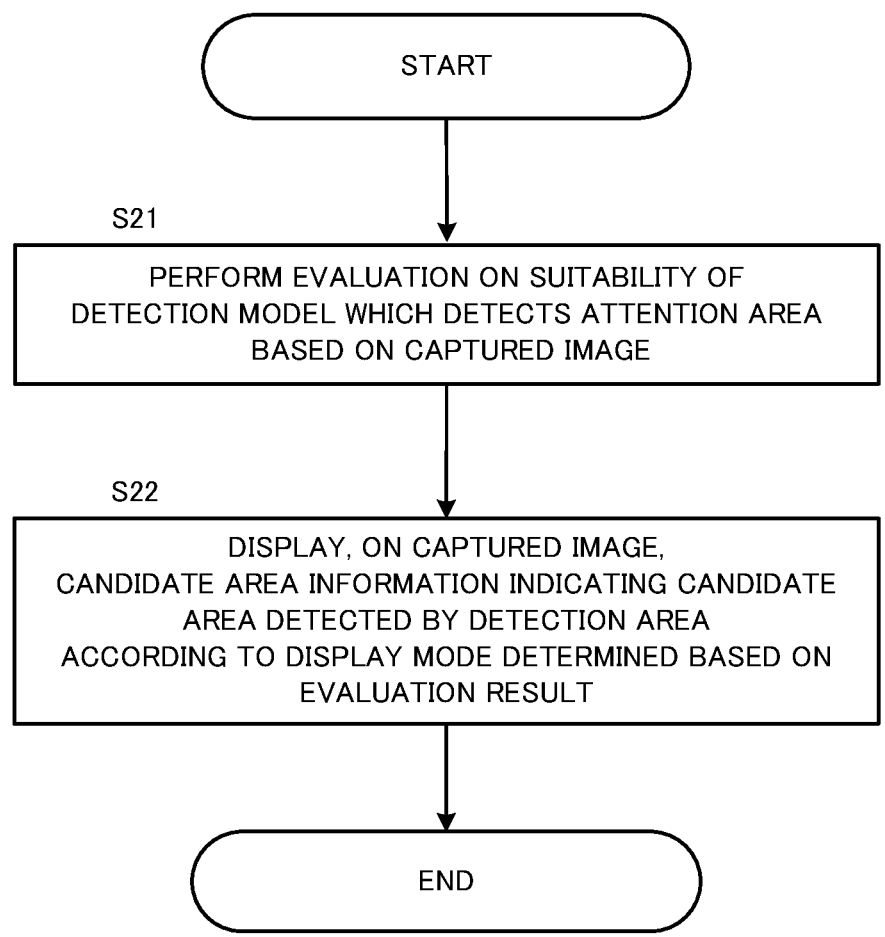
FIG. 14 is an example of a flowchart to be executed by the image processing device in the second example embodiment.

FIG. 14 is an example of a flowchart showing the processing procedure in the second example embodiment. First, the detection model evaluation means 31X perform an evaluation on suitability of a detection model for detecting an attention area to be noted based on a captured image "Ic" in which an inspection target is photographed by a photographing unit provided in an endoscope (step S21). The display control means 33X displays candidate area information according to a display mode determined based on a result of the evaluation, the candidate area information indicating one or more candidate areas that are one or more candidates of the attention area, the candidate areas being detected by one or more detection models included in detection model(s) subjected to the evaluation, the candidate area information being superimposed on the captured image Ic which is displayed by a display device 2X (step S22).

According to the second example embodiment, the image processing device 1X can display the candidate area information indicating the candidate area for an attention area according to an appropriate display mode corresponding to the evaluation of the detection model for detecting the attention area, and thereby enable the observer to accurately recognize the attention area.

The whole or a part of the example embodiments described above (including modifications, the same applies hereinafter) can be described as, but not limited to, the following Supplementary Notes.

Supplementary Note 1

An image processing device, comprising:
a detection model evaluation means configured to perform an evaluation on suitability of a detection model for detecting an attention area to be noted based on a captured image in which an inspection target is photographed by a photographing unit provided in an endoscope; and
a display control means configured to display candidate area information according to a display mode determined based on a result of the evaluation,
the candidate area information indicating one or more candidate areas that are one or more candidates of the attention area,
the candidate areas being detected by one or more detection models included in detection model(s) subjected to the evaluation,
the candidate area information being superimposed on the captured image which is displayed by a display device.

Supplementary Note 2

The image processing device according to Supplementary Note 1,
wherein the detection model evaluation means is configured to output, as the result of the evaluation, a degree of confidence regarding the suitability of each of the detection model(s) subjected to the evaluation, and
wherein the display control means is configured to determine the display mode of the candidate area information corresponding to each of the one or more candidate areas based on the degree of confidence corresponding to each of the one or more detection models.

Supplementary Note 3

The image processing device according to Supplementary Note 1,
wherein the detection model evaluation means is configured to specify, as the result of the evaluation, the one or more detection models, and
wherein the display control means is configured to display the candidate area information corresponding to each of the one or more candidate areas according to the display mode associated with each of the one or more detection models.

Supplementary Note 4

The image processing device according to any one of Supplementary Notes 1 to 3,
wherein the display control means is configured to display the candidate area information according to the display mode in which the higher evaluation on a detection model which detected a candidate area is, the more conspicuous the candidate area information corresponding to the candidate area becomes on the captured image.

Supplementary Note 5

The image processing device according to any one of Supplementary Notes 1 to 4,
wherein the display control means is configured to display, as the candidate area information, a contour line surrounding each of the one or more candidate areas or an area superimposed on each of the one or more candidate areas.

Supplementary Note 6

The image processing device according to Supplementary Note 5,
wherein the display control means is configured to change at least one of a color, a shape, or a density of the contour line or the area depending on the result of the evaluation.

Supplementary Note 7

The image processing device according to any one of Supplementary Notes 1 to 6, further comprising
a lesion detection means configured to detect the one or more candidate areas based on the one or more detection models and the captured image.

Supplementary Note 8

The image processing device according to any one of Supplementary Notes 1 to 7,
wherein the detection model evaluation means is configured to perform, based on the captured image, the evaluation on a state dependent detection model prepared for each state of the inspection target, and
wherein the display control means is configured to display the candidate area information for the candidate area detected by the state dependent detection model selected based on the result of the evaluation.

Supplementary Note 9

The image processing device according to any one of Supplementary Notes 1 to 8, further comprising:
an input accepting means configured to accept an input relating to whether or not the candidate area corresponds to the actual attention area; and
a learning means configured to learn, based on the input, an evaluation model to be used in execution of the evaluation by the detection model evaluation means.

Supplementary Note 10

The image processing device according to any one of Supplementary Notes 1 to 9,
wherein the one or more detection models are the detection model(s)
which correspond to a top predetermined number of the evaluations or
which correspond to the evaluations equal to or higher than a threshold.

Supplementary Note 11

A control method executed by a computer, the control method comprising:
performing an evaluation on suitability of a detection model for detecting an attention area to be noted based on a captured image in which an inspection target is photographed by a photographing unit provided in an endoscope; and
displaying candidate area information according to a display mode determined based on a result of the evaluation,
the candidate area information indicating one or more candidate areas that are one or more candidates of the attention area,
the candidate areas being detected by one or more detection models included in detection model(s) subjected to the evaluation,
the candidate area information being superimposed on the captured image which is displayed by a display device.

Supplementary Note 12

A storage medium storing a program executed by a computer, the program causing the computer to function as:
a detection model evaluation means configured to perform an evaluation on suitability of a detection model for detecting an attention area to be noted based on a captured image in which an inspection target is photographed by a photographing unit provided in an endoscope; and
a display control means configured to display candidate area information according to a display mode determined based on a result of the evaluation,
the candidate area information indicating one or more candidate areas that are one or more candidates of the attention area,
the candidate areas being detected by one or more detection models included in detection model(s) subjected to the evaluation,
the candidate area information being superimposed on the captured image which is displayed by a display device.

While the invention has been particularly shown and described with reference to example embodiments thereof, the invention is not limited to these example embodiments. It will be understood by those of ordinary skilled in the art that various changes in form and details may be made therein without departing from the spirit and scope of the present invention as defined by the claims. In other words, it is needless to say that the present invention includes various modifications that could be made by a person skilled in the art according to the entire disclosure including the scope of the claims, and the technical philosophy. All Patent and Non-Patent Literatures mentioned in this specification are incorporated by reference in its entirety.

DESCRIPTION OF REFERENCE NUMERALS 1, 1X Image processing device
2 Display device
3 Endoscope
4 Server device
11 Processor
12 Memory
13 Interface
14 Input unit
15 Light source unit
16 Audio output unit
100, 100A Endoscopic inspection system

What is claimed is:

1. An image processing device comprising:
at least one memory configured to store instructions; and
at least one processor configured to execute the instructions to:
based on a captured image in which an inspection target is photographed by a photographing unit provided in an endoscope, perform an evaluation on suitability of a detection model for detecting an attention area before execution of the detection model; and
display candidate area information according to a display mode determined based on a result of the evaluation performed before the execution of the detection model,
the candidate area information indicating one or more candidate areas that are one or more candidates of the attention area,
the candidate areas being detected by one or more detection models included in detection model(s) subjected to the evaluation,
the candidate area information being superimposed on the captured image which is displayed by a display device.

2. The image processing device according to claim 1,
wherein the at least one processor is configured to execute the instructions to output, as the result of the evaluation, a degree of confidence regarding the suitability of each of the detection model(s) subjected to the evaluation, and
wherein the at least one processor is configured to execute the instructions to determine the display mode of the candidate area information corresponding to each of the one or more candidate areas based on the degree of confidence corresponding to each of the one or more detection models.

3. The image processing device according to claim 1,
wherein the at least one processor is configured to execute the instructions to specify, as the result of the evaluation, the one or more detection models, and
wherein the at least one processor is configured to execute the instructions to display the candidate area information corresponding to each of the one or more candidate areas according to the display mode associated with each of the one or more detection models.

4. The image processing device according to claim 1, wherein the at least one processor is configured to execute the instructions to display the candidate area information according to the display mode in which the higher evaluation on a detection model which detected a candidate area is, the more conspicuous the candidate area information corresponding to the candidate area becomes on the captured image.

5. The image processing device according to claim 1, wherein the at least one processor is configured to execute the instructions to display, as the candidate area information, a contour line surrounding each of the one or more candidate areas or an area superimposed on each of the one or more candidate areas.

6. The image processing device according to claim 5, wherein the at least one processor is configured to execute the instructions to change at least one of a color, a shape, or a density of the contour line or the area depending on the result of the evaluation.

7. The image processing device according to claim 1, wherein the at least one processor is further configured to execute the instructions to detect the one or more candidate areas based on the one or more detection models and the captured image.

8. The image processing device according to claim 1, wherein the at least one processor is configured to execute the instructions to perform, based on the captured image, the evaluation on a state dependent detection model prepared for each state of the inspection target, and
wherein the at least one processor is configured to execute the instructions to display the candidate area information for the candidate area detected by the state dependent detection model selected based on the result of the evaluation.

9. The image processing device according to claim 1, wherein the at least one processor is configured to execute the instructions: to accept an input relating to whether or not the candidate area corresponds to the actual attention area; and
to learn, based on the input, an evaluation model to be used in execution of the evaluation.

10. The image processing device according to claim 1, wherein the one or more detection models are the detection model(s) which correspond to a top predetermined number of the evaluations or which correspond to the evaluations equal to or higher than a threshold.

11. The image processing device according to claim 1, wherein the at least one processor is configured to execute the instructions to
perform the evaluation on suitability of plural detection models before execution of the detection model, and
select, based on the evaluation, one or more detection models to detect the attention area from the plural detection models.

12. A control method executed by a computer, the control method comprising:
based on a captured image in which an inspection target is photographed by a photographing unit provided in an endoscope, performing an evaluation on suitability of a detection model for detecting an attention area before execution of the detection model; and
displaying candidate area information according to a display mode determined based on a result of the evaluation performed before the execution of the detection model,
the candidate area information indicating one or more candidate areas that are one or more candidates of the attention area,
the candidate areas being detected by one or more detection models included in detection model(s) subjected to the evaluation,
the candidate area information being superimposed on the captured image which is displayed by a display device.

13. A non-transitory computer readable storage medium storing a program executed by a computer, the program causing the computer to:
based on a captured image in which an inspection target is photographed by a photographing unit provided in an endoscope, perform an evaluation on suitability of a detection model for detecting an attention area before execution of the detection model; and
display candidate area information according to a display mode determined based on a result of the evaluation performed before the execution of the detection model,
the candidate areas being detected by one or more detection models included in detection model(s) subjected to the evaluation,
the candidate area information being superimposed on the captured image which is displayed by a display device.

* * * * *